(12) United States Patent
Chong

(10) Patent No.: US 12,039,339 B1
(45) Date of Patent: Jul. 16, 2024

(54) SYSTEM CONFIGURATION CONTROL THROUGH LOCKING OF CONTROL REGISTERS

(71) Applicant: Amazon Technologies, Inc., Seattle, WA (US)

(72) Inventor: Nathan Yong Seng Chong, Ponte Vedra, FL (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 17/809,461

(22) Filed: Jun. 28, 2022

(51) Int. Cl.
*G06F 9/00* (2018.01)
*G06F 3/06* (2006.01)
*G06F 9/4401* (2018.01)

(52) U.S. Cl.
CPC .......... *G06F 9/4401* (2013.01); *G06F 3/0622* (2013.01); *G06F 3/0655* (2013.01); *G06F 3/0679* (2013.01)

(58) Field of Classification Search
CPC .... G06F 9/4401; G06F 3/0622; G06F 3/0655; G06F 3/0679
See application file for complete search history.

(56) References Cited

U.S. PATENT DOCUMENTS

| | | | | |
|---|---|---|---|---|
| 7,778,074 B2 * | 8/2010 | Ahmed | ................... | G11C 17/18 365/185.04 |
| 2005/0240585 A1 * | 10/2005 | Makhervaks | ........... | G06F 9/526 |
| 2007/0050567 A1 * | 3/2007 | Murakami | ............ | G06F 9/3004 711/150 |
| 2007/0300050 A1 * | 12/2007 | Zimmer | .................... | G06F 8/65 713/1 |
| 2008/0270723 A1 * | 10/2008 | Ueda | ................... | G06F 13/4217 711/E12.091 |

(Continued)

OTHER PUBLICATIONS

ARM Developer. "Arm® Architecture Reference Manual for A-profile architecture", ARM DDI 0487H.a, ID020222, Chapter G5: The AArch32 Virtual Memory System Architecture, pp. 8830-8970, Feb. 4, 2022. URL: https://developer.arm.com/documentation/ddi0487/ha/?lang=en [accessed Aug. 30, 2022].

(Continued)

*Primary Examiner* — Nitin C Patel
(74) *Attorney, Agent, or Firm* — Weaver Austin Villeneuve & Sampson LLP

(57) ABSTRACT

Disclosed herein are methods and corresponding apparatus and systems for controlling the configuration of a computer system through locking one or more control registers. In some embodiments, a write-enable controller is configured to permit writing to a control register by a software application when the value of a lock bit has been set to indicate that the control register is unlocked. The control register can be locked by setting the lock bit after the control register has been written to, e.g., as part of a system initialization process that places the computer system into a target configuration. After the control register has been locked, the write-enable controller may prevent further writes to the control register, e.g., a write request from the same application that wrote to the control register earlier or a different software application. The locking of the control register can be maintained until system reset.

20 Claims, 8 Drawing Sheets

(56) References Cited

U.S. PATENT DOCUMENTS

| | | | |
|---|---|---|---|
| 2010/0268926 A1* | 10/2010 | Zhang | G06F 11/1417 |
| | | | 713/2 |
| 2020/0089507 A1* | 3/2020 | Froehlich | H04L 9/3247 |
| 2021/0232510 A1* | 7/2021 | Ndu | G06F 9/4401 |
| 2022/0058141 A1* | 2/2022 | Magro | G06F 12/1009 |

OTHER PUBLICATIONS

ARM Developer. "ARM Architecture Reference Manual: Security Extensions Supplement", ARM DDI 0309F, Nov. 2005, 120 pages. URL: https://developer.arm.com/documentation/ddi0309/f/Memory-and-System-Architecture/System-control-coprocessor/CP15SDISABLE-input [accessed Aug. 30, 2022].

* cited by examiner

SYSTEM CONFIGURATION CONTROL THROUGH LOCKING OF CONTROL REGISTERS

BACKGROUND

Computing devices are often designed to be highly configurable with respect to the enabling or disabling of features. For instance, a processor designed for general-purpose computing may support numerous configurations tailored for execution of different types of software applications. Configurability is useful because a manufacturer of a processor or other configurable component does not necessarily know in advance what features will be enabled when the processor or component is integrated into a computer system. Thus, the configuration space for a computer system that includes a configurable component (e.g., one or more processors) is potentially large and complex. Such complexity can make the computer system susceptible to security risks or unintended system behavior. For example, the computer system may be vulnerable to the so-called "confused deputy" problem, in which a computer program with the capability to configure a particular setting or perform some action is tricked by another program into misusing such capability to compromise the performance or integrity of the computer system. Having many configuration options also increases the likelihood of inadvertent misconfiguration, for example, when a program accidentally configures a setting that is seldom used or not needed for runtime execution.

BRIEF DESCRIPTION OF THE DRAWINGS

Various embodiments in accordance with the present disclosure will be described with reference to the drawings, in which.

DETAILED DESCRIPTION

Disclosed herein are techniques for controlling the configuration of a computer system based on locking of control registers. According to some aspects of the present disclosure, a computer system with one or more configurable components is placed into a target configuration through programming at least one control register. A control register can be programmed through an instruction from a software application that has the authority to do so. The programming may involve writing one or more values into the control register. Depending on the value stored in the control register, functionality provided by a hardware component in the computer system may be enabled, disabled, or otherwise configured. Once the computer system has been placed into the target configuration, the control register can be locked by setting a lock bit associated with the control register.

The setting of the lock bit can be performed by the same application that wrote to the control register or some other application with authority (e.g., a requisite privilege level) to do so. After the control register has been locked, the computer system prevents further modification of the contents of the control register. Accordingly, an application may lock itself out by ceding the ability to reprogram the control register while at the same time locking out other applications that are executable by the computer system. In some implementations, a control register that has been locked cannot be unlocked until the computer system is reset. In this manner, the runtime state of the computer system can be frozen in the target configuration. Although the locking of the control register may be maintained throughout the course of system operation, the control register can be reverted to an unlocked state upon system reset. In this manner, the configuration may only be frozen temporarily, and the computer system can later be put into a different configuration, e.g., to support the operation of a newly installed application or hardware component. In contrast to methods that permanently lock the system configuration (e.g., through a software instruction that sets a fuse in a circuit of a control register), temporary freezing preserves the ability to reconfigure the computer system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
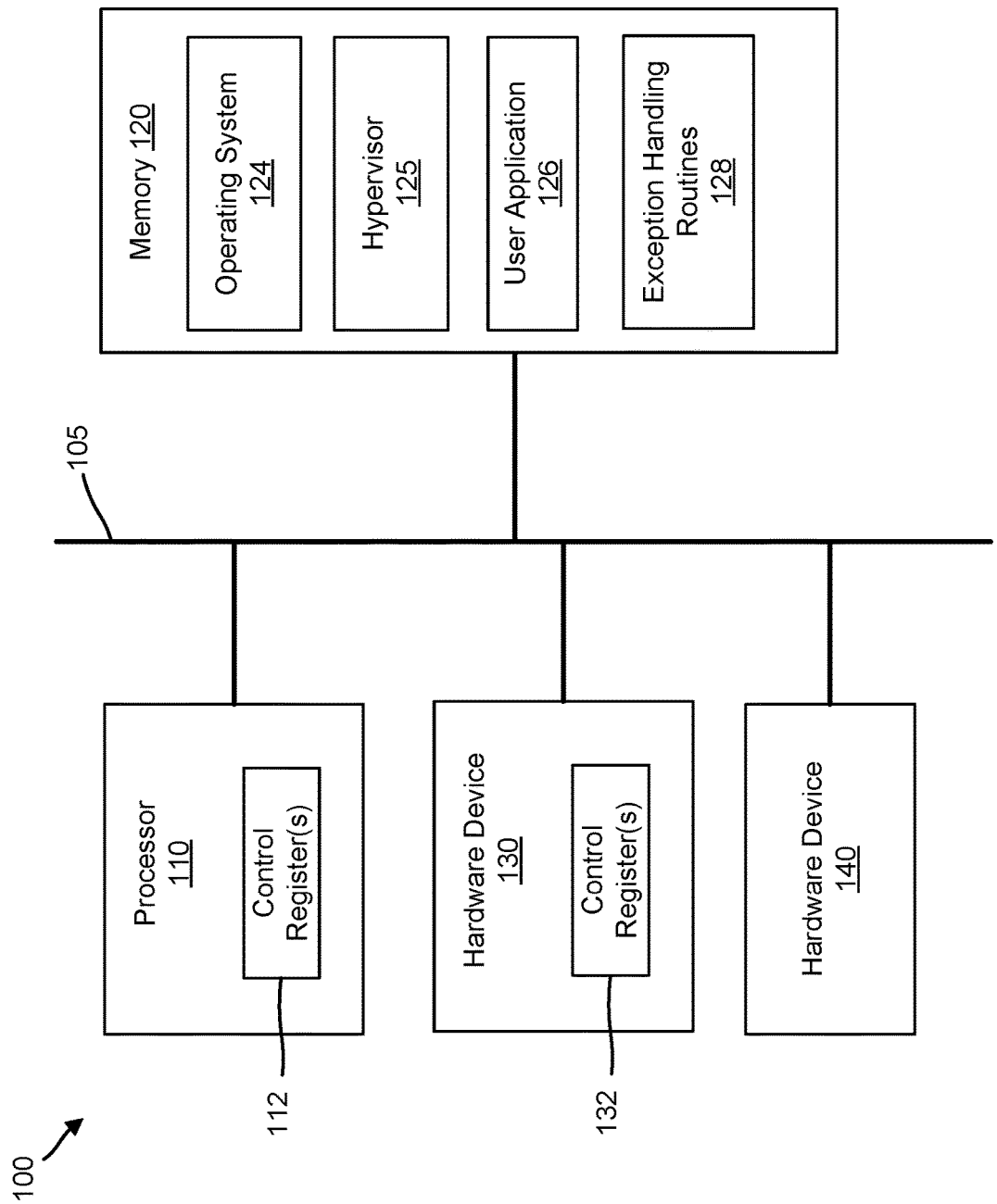
FIG. 1 illustrates an example computer system, according to certain aspects of the disclosure.

FIG. 1 shows a block diagram of an example computer system 100, according to certain aspects of the disclosure. The computer system 100 includes various resources, such as computing resources (e.g., a processor 110), storage resources (e.g., a memory 120), networking resources, and/or the like. Such resources can be made available to software applications executing on the computer system 100 or, in some instances, an application executing on a remote computing device (e.g., a client computer). The availability of the resources may depend on how the components that provide these resources are configured. Components in the computer system 100 may be communicatively coupled to each other through wired and/or wireless connections. For instance, as shown in the figure, the processor 110 and the memory 120 may be connected via a communication channel 105. The communication channel 105 may include one or more busses, meshes, matrices, or fabrics. The communication channel 105 may also connect other components such as a hardware device 130 and a hardware device 140.

The overall configuration of the computer system 100 can be a result of individually configuring one or more components. At least some of the configuration may involve programming a control register. For example, FIG. 1 shows the processor 110 as including one or more control registers 112. Likewise, the device 130 includes one or more control registers 132. Some components, such as the memory 120 and the device 140, may not include control registers. However, such components may still be configured, for example, through programming a control register of another component that accesses a component lacking a control register to specify the manner of access.

A component in the computer system 100 may include other types of registers besides control registers. In general, a register can be any hardware-implemented storage element associated with a computing component and which is directly accessible to the computing component. For instance, the processor 110 may be a central processing unit (CPU) that includes an address register, a program counter, an instruction register, and one or more general-purpose registers. Registers are often implemented using sequential logic, e.g., flip-flops, and tend to be much smaller in storage capacity compared to memory used to hold instructions or application data. For example, the control registers 112 and 132 may be 32-bit or 64-bit registers, whereas the memory 120 may have several gigabytes or terabytes of storage. Additionally, in various implementations, one or more components of the computer system 100 may include logical registers. For example, a logical register of a CPU or other processor can be dynamically mapped to a hardware-implemented (physical) register through register renaming and in connection with pipelined execution of instructions by the CPU/processor.

Control registers (alternately referred to herein as "configuration registers") are physical registers that can store settings for components of a computer system. The content of a control register may include one or more configuration parameter values. For example, the hardware device 130 may be a direct memory access (DMA) controller that is configured based on a value in a control register 132. Each parameter value may be as small as a single bit but can, in some instances, include a combination of bits. Thus, a 32-bit control register may be divided into multiple fields, where each field controls a separate feature or function. The parameter values in a control register may pertain directly to the operation of the component that the control register is associated with. Alternatively or additionally, a control register may include a parameter value governing the operation of an external component. For example, the processor 110 may include a built-in memory management unit (MMU) configured to translate memory addresses from a virtual address space to a physical address space of the memory 120. Alternatively, the processor 110 may be configured to communicate with an external MMU (e.g., the hardware device 140). The built-in MMU or the external MMU can be selectively enabled or disabled through setting a bit in a control register 112 (e.g., 1 for enabled, 0 for disabled). In some implementations, a control register may be initialized to a certain value. For example, a control register 112 and/or a control register 132 may be hard-coded with a set of default values. Alternatively or additionally, control register and/or control register 132 may be programmed as part of software-based configuration that occurs during initialization of the computer system 100, e.g., when the system boots up.

The mechanism through which a component or feature of a component is enabled/disabled based on a value of a control register depends on implementation. For example, the processor 110 may disable an address translation capability of a built-in MMU. In the case of an external MMU, the processor 110 may prevent itself from issuing commands that involve virtual address translation. Alternatively, the processor 110 could issue a command instructing the external MMU to turn off address translation.

Control registers can be programmed using an instruction issued by a software application executing on the computer system 100. The instruction may be defined as part of an instruction set architecture (ISA) of a component with which a control register is associated. For instance, the ISA of the processor 110 may include a load instruction for reading a value from a control register 112 and a store instruction for writing a value to a control register 112. An application executing in the computer system 100 may not necessarily have access to every control register. For instance, as described below in connection with FIG. 2, software applications may be assigned to one of several privilege levels, where each privilege level may be associated with its own set of control registers. Depending on the privilege level assigned to a component, the component may have authority or permission to access (e.g., read and/or write) some control registers but not other control registers. Some applications in the computer system 100 may have no access or visibility into any control register.

FIG. 1 shows some examples of applications that can be executed on the computer system 100. The applications may reside in the memory 120 and can include an operating system 124, a hypervisor 125, and a user application 126. The memory 120 can be implemented as a single memory device or a combination of memory devices. For example, memory 120 may include static random access memory (SRAM), dynamic random access memory (DRAM), read only memory (ROM), or other memory technology. Memory 120 may also include optical storage (e.g., a CD-ROM drive), a solid state drive, a hard disk drive, and/or the like. Operating system 124 may be configured to manage resources in the computer system 100 and to operate as an interface between other applications and the resources. For instance, the operating system 124 may allocate part of a physical address space (e.g., a range of physical addresses associated with the memory 120) for runtime use by the user application 126. As another example, the operating system 124 may handle input/output (IO) to and from hardware devices (e.g., device 130 and/or device 140) based on application program interface (API) calls issued by the user application 126.

Hypervisor 125 is a virtual machine manager (VMM) responsible for supervising the execution of virtual machines (VMs). For example, the hypervisor 125 may create, start, monitor, stop, or delete VM instances executing on the processor 110 and/or other processors in the computer system 100. In some cases, the hypervisor 125 may configure a set of VMs to provide functionality corresponding to components in a physical machine or system, thereby emulating the physical machine or system in a virtualized environment. Each VM may be assigned corresponding resources, e.g., a virtual address space separate from other virtual address spaces.

In some implementations, the computer system 100 may be configured to provide services in a multi-tenant computing environment, using servers that host data and/or execute software applications on behalf of different tenants or clients. For instance, the computer system 100 can operate as a data center with servers that are connected via one or more communication networks. In a multi-tenant scenario, tenants or clients can run their respective applications in a virtualized environment on the same hardware. Accordingly, in some implementations, a VM may have its own operating system separate from the operating system 124. In such implementations, the hypervisor 125 can manage access to resources (e.g., computing, storage, and/or networking) for VMs executing their respective operating systems. The hypervisor 125 may also be responsible for virtual machine scheduling and enforcing isolation between different VMs, e.g., so that one VM cannot access memory allocated to another VM. The hypervisor 125 can also manage the flow of information between software, virtualized hardware, and physical hardware.

Operating system 124 and hypervisor 125 are examples of applications that may be capable of programming control registers, e.g., the control registers 112 and 132. Programming of control registers is generally performed by low-level software applications that reside between hardware and higher-level applications. An example of a high-level application is an application operated by an end-user or client, e.g., the user application 126. Low-level applications tend to have greater access and visibility into the hardware of the computer system. As such, the operating system 124 and/or the hypervisor 125 may be responsible for placing the computer system 100 into a target configuration that is suitable for performing tasks requested by the higher-level applications. The target configuration can be a global configuration shared by the user application 126 and other applications that are executable by the computer system, e.g., applications running on virtual machines. Once the computer system 100 has been placed into the target configuration, the configuration state of computer system 100 can be at least partially frozen by locking one or more control registers, e.g., the control registers 112 and/or 132. In this manner, the runtime execution environment of the computer system 100 can be protected against security breaches (e.g., malware attacks) or unintended system behavior. Unintended behavior may arise, for example, when an application accidentally configures a setting unrelated to the operation of the application due to a programming error (e.g., a software bug).

The locking of the control register(s) can be performed through a locking instruction issued by an application with sufficient authority, e.g., a low-level application such as the operating system 124 or the hypervisor 125. The locking instruction may be defined as part of an instruction set of a component with which a control register is associated. In some implementations, the computer system 100 may support multiple types of locking instructions. For example, a locking instruction for a control register 112 of the processor 110 may have a different format than a locking instruction for a control register 132 of the device 130.

Once a control register has been locked, a subsequent attempt to write to the control register may trigger an exception that is generated by one or more processing units in the computer system 100. The one or more processing units may implement a write-enable controller for one or more control registers. In some implementations, each control register may be provided with its own write-enable controller, for example, a digital circuit configured to read the lock bit(s) of the control register. The write-enable controller may be integrated into the control register or the component (e.g., processor 110) with which the control register is associated. In other implementations, control registers may share a write-enable controller. For instance, the computer system 100 may include a write-enable controller that is capable of reading the lock bits of every control register, e.g., through communications over the communication channel 105.

An exception can be triggered using a hardware interrupt that provides information indicating what type of exception occurred. For instance, an exception arising from an attempt to write to a locked control register may have a specific exception vector associated with it and which distinguishes such an exception from exceptions that arise in other contexts. The exception vector can be mapped to an entry in a table, where the table entries describe which routine among a set of exception handling routines 128 is to be used to respond to the exception. As shown in FIG. 1, the exception handling routines 128 can be stored in the memory 120. Alternatively or additionally, some devices may include their own exception handling routines, e.g., routines stored in local memory of the device.

In some implementations, the handling routine for an exception arising from an attempt to write to a locked control register may be configured to signal a "fatal" error and immediately terminate the processing of pending requests from applications that are executing. Further, the handling routine may cause the computer system 100 to generate an error message that is displayed to a user. The error message may, for example, prompt the user to manually reset the computer system. In addition to terminating pending requests, the computer system 100 may block applications from further access to compute, storage, or other resources provided by the computer system. The computer system 100 may block all applications, e.g., including applications that are not currently being executed. Alternatively, the computer system 100 may only block a subset of applications. For instance, the computer system 100 may block only executing applications, only user applications, or only the application that attempted to write to the locked control register.

Figure 2:
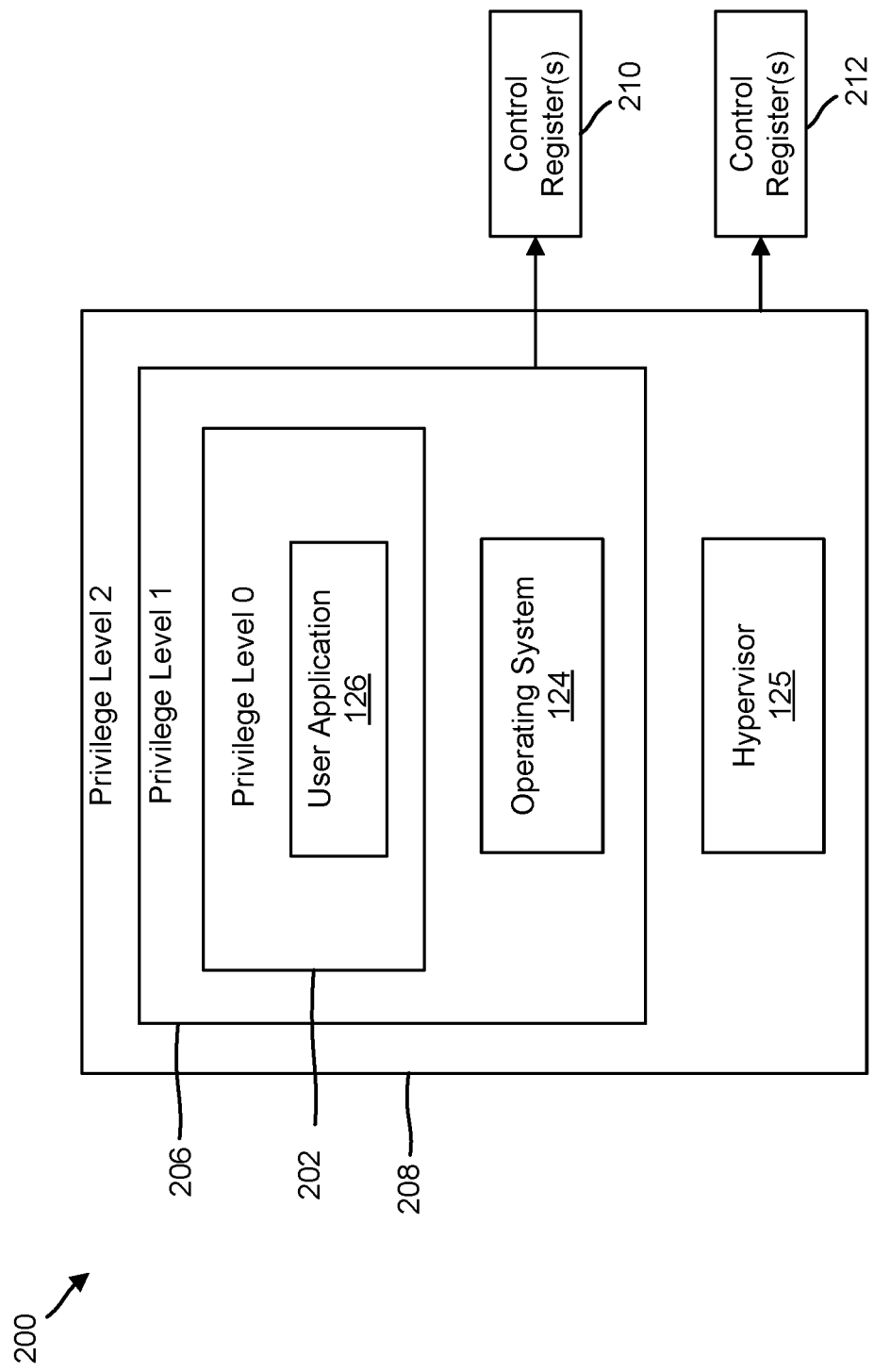
FIG. 2 illustrates an example of a privilege level hierarchy, according to certain aspects of the disclosure.

FIG. 2 illustrates an example of a privilege level hierarchy 200, according to certain aspects of the disclosure. The hierarchy 200 includes a set of security domains 202, 206, and 208. Each security domain has a corresponding privilege level that determines what permissions an application has. In the example of FIG. 2, the privilege levels are nested, with lower (less privileged) levels being subsumed into higher (more privileged) levels. As shown, the user application 126 may reside in security domain 202 (privilege level 0), the operating system 124 may reside in security domain 206 (privilege level 1), and the hypervisor 125 may reside in security domain 208 (privilege level 2). A privilege level may grant an application permission to access a corresponding set of control registers. For instance, applications assigned to privilege level 0 may have no access to any control registers, applications assigned to privilege level 1 may have access to one or more control registers 210, and applications assigned to privilege level 2 may have access to one or more control registers 212. Because the privilege levels are nested, applications assigned to higher privilege levels may also have access to control registers that are associated with lower privilege levels. For example, the hypervisor 125 may be able to read and write the control registers 210 and the control registers 212, whereas the operating system 124 may be able to read and write the control registers 210 but not the control registers 212.

Figure 3B:
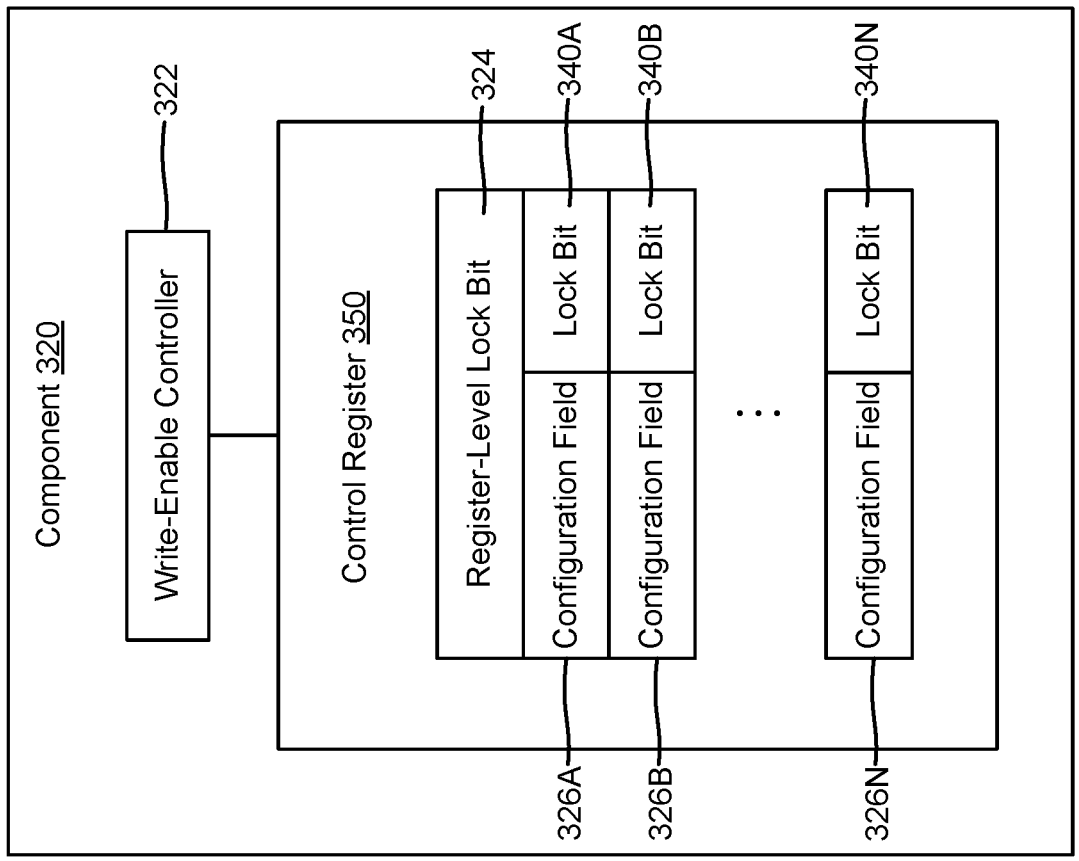
FIGS. 3A and 3B illustrate examples of lockable control registers, according to certain aspects of the disclosure.
Figure 3A:
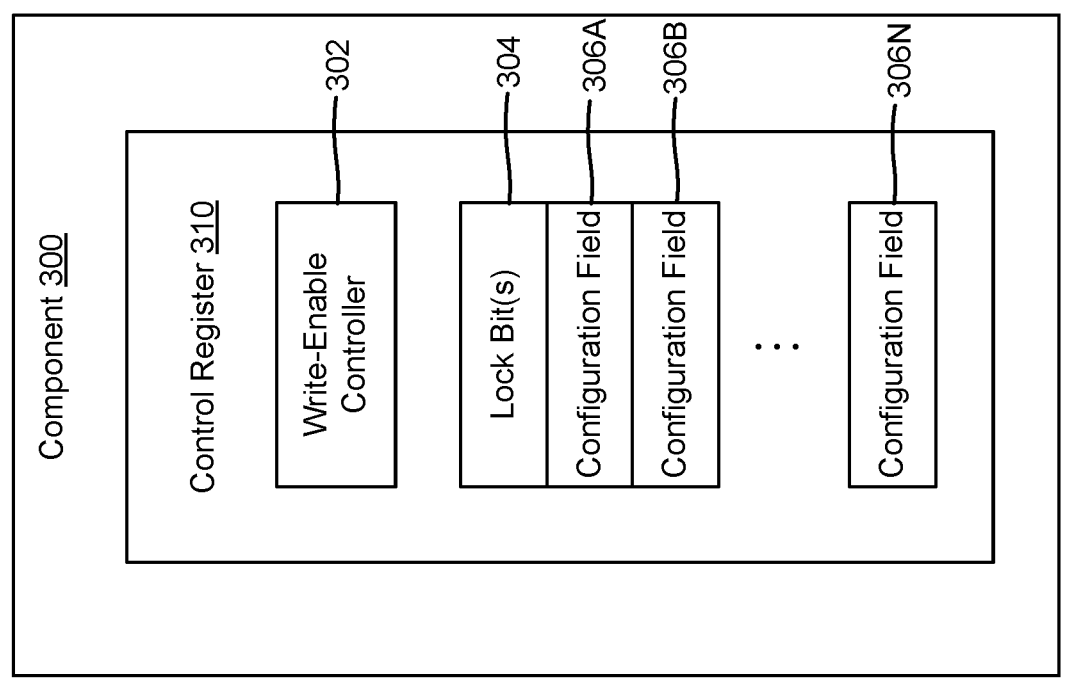

FIG. 3A illustrates an example of a control register 310 including one or more lock bits 304, according to certain aspects of the disclosure. The control register 310 is part of a component 300 in a computer system. The component 300 may, for example, correspond to the processor 110 or the hardware device 130 in FIG. 1. The control register 310 further includes a write-enable controller 302 and a set of configuration fields 306 (e.g., fields 306A, 306B, and 306N). The configuration fields 306 can store a value for one or more configuration parameters relating to functionality supported by the component 300 or some other component that is communicatively coupled to the component 300. Each configuration field 306 is at least 1-bit long. The combined length of the configuration fields 306 may be a standard length, e.g., 32-bit, 64-bit, or some other power of 2. Each configuration field may be used to store a value for a corresponding configuration parameter. The meaning assigned to the value of a configuration field is typically defined by a designer or manufacturer of the component associated with the control register. In some instances, configuration fields and the meaning associated with possible or permitted values of those configuration fields may be published as part of documentation (e.g., a technical specification) authored by the designer or manufacturer. The lock bit(s) 304 may correspond to addition bits that extend the storage capacity of the control register 310 beyond the standard length. The lock bit(s) 304 may be reserved for indicating the lock status of the control register. Thus, the controller register 310 could be a 33-bit register in which bit no. 33 is a lock bit and bits 1 to 32 are available for storing one or more values.

The lock bit(s) 304 can include a single bit representing the lock status of the entire control register 310, e.g., a bit that is set to 0 to indicate that the control register is unlocked and 1 to indicate that the control register is locked. In some implementations, a separate lock bit 304 is provided for each security domain in a set of security domains. For instance, a first lock bit may indicate whether the control register 310 is inaccessible (e.g., non-writeable or both non-writeable and non-readable) to applications assigned to privilege level 0, a second lock bit may indicate whether the control register 310 is inaccessible to applications assigned to privilege level 1, and a third lock bit may indicate whether the control register 310 is inaccessible to applications assigned to privilege level 2.

Write-enable controller 302 is responsible for disabling writes to the control register 310 when the control register 310 has been locked. In some implementations, the write-enable controller 302 may be configured to detect whether an incoming write request (e.g., a store instruction directed to any of the configuration fields 306) has been received while the lock bit(s) 304 have been set to indicate that the control register 310 is locked. The write-enable controller 302 can be implemented in hardware, software, or a combination of hardware and software. For instance, write-enable controller 302 may include a comparator circuit with a first input tied to logic level 0 or 1 and a second input coupled to a lock bit representing the lock status of the entire control register. Similarly, in a multiple lock bit implementation, the write-enable controller 302 may include a separate comparator for each lock bit, with the outputs of the comparators being combined using logic gates (AND, OR, XOR, etc.).

In response to detecting that a write request has been received while the control register 310 is locked, the write-enable controller 302 may output a signal indicating that an exception has occurred. The output signal of the write-enable controller 302 may cause the component 300 to generate an interrupt that is processed using an appropriate exception handling routine. In some instances, the output signal of the write-enable controller 302 may communicate an exception vector. Further, the write-enable controller 302 may generate one or more control signals that prevent the control register 310 from being written, e.g., a signal controlling a switch or gate that couples incoming data to one or more configuration fields 306.

FIG. 3A is merely an example of one way to implement a lockable control register. In other implementations, a lockable control register may feature elements or an arrangement of elements that differ from that shown in FIG. 3A. For instance, the write-enable controller 302 may be external to the control register 310, e.g., as a separate circuit in the component 300 or coupled to the component 300. FIG. 3B illustrates another example of a lockable control register.

In FIG. 3B, a component 320 includes a write-enable controller 322 and a control register 350 coupled to the write-enable controller 322. The write-enable controller 322 is analogous to the write-enable controller 302 in FIG. 3A and has similar functionality, including the ability to disable writes to the control register 350 when a lock bit has been set to indicate that the control register 350 is locked. The control register 350 includes a register-level lock bit 324 that functions similarly to the single lock bit implementation described above. That is, the register-level lock bit 324 can be set to indicate that the entire control register 350 is locked. Additionally, the control register 350 includes lock bits 340 that are specific to individual configuration fields. For example, the control register 350 may include a lock bit 340A indicating a lock status of a configuration field 326A, a lock bit 340B indicating a lock status of a configuration field 326B, and a lock bit 340N indicating a lock status of a configuration field 326N. Some configuration fields may be designed to store configuration parameters that are more critical to maintaining expected system behavior. Lock bits 340 may be provided to prevent overwriting of the values of such configuration fields without also providing lock bits for other, less important configuration fields. Accordingly, the control register 350 may provide a finer degree of control over the locking of its contents, by permitting configuration fields to be locked independently. Based on the examples of FIGS. 3A and 3B, it will therefore be understood that, depending on implementation, a control register can be locked, in whole or in part, to prevent writing of the control register by all software applications or only a subset of applications (e.g., based on privilege level).

In the examples described above with respect to FIGS. 3A and 3B, the write-enable controller signals an exception whenever a write request is received while the lock bit(s) have been set to indicate that the control register (or a relevant portion of the control register) is locked. In the case of the register-level lock bit 324, the exception is triggered irrespective of the destination in the control register 350. When using field-specific lock bits 340, the exception is triggered when the write request is attempting to write to a locked configuration field.

Additionally, in some implementations a write-enable controller may be configured to compare the data of an incoming write request to the contents of the destination in the control register so that an exception is signaled only when the write request is attempting to modify the contents, e.g., to change the value of a configuration field to a different value. If the data being written to the destination is identical to the existing contents of the destination, the write-enable controller may not necessarily signal an exception because the write request would not change what is already stored. However, from a security perspective, it may be beneficial to signal an exception whenever an attempt to write to a locked control register is made, even if the contents of the control register would not be changed. Signaling an exception in such instances can potentially reduce security risk because the computer system may be designed with the expectation that no applications will attempt to write to a control register once the control register has already been written, e.g., as part of system initialization. Any attempt to write to a locked control register, even if such an attempt would not result in changing the contents, may indicate that an application has been compromised (e.g., by malware in a Confused Deputy scenario) or is malfunctioning (e.g., due to a programming bug).

Figure 4:
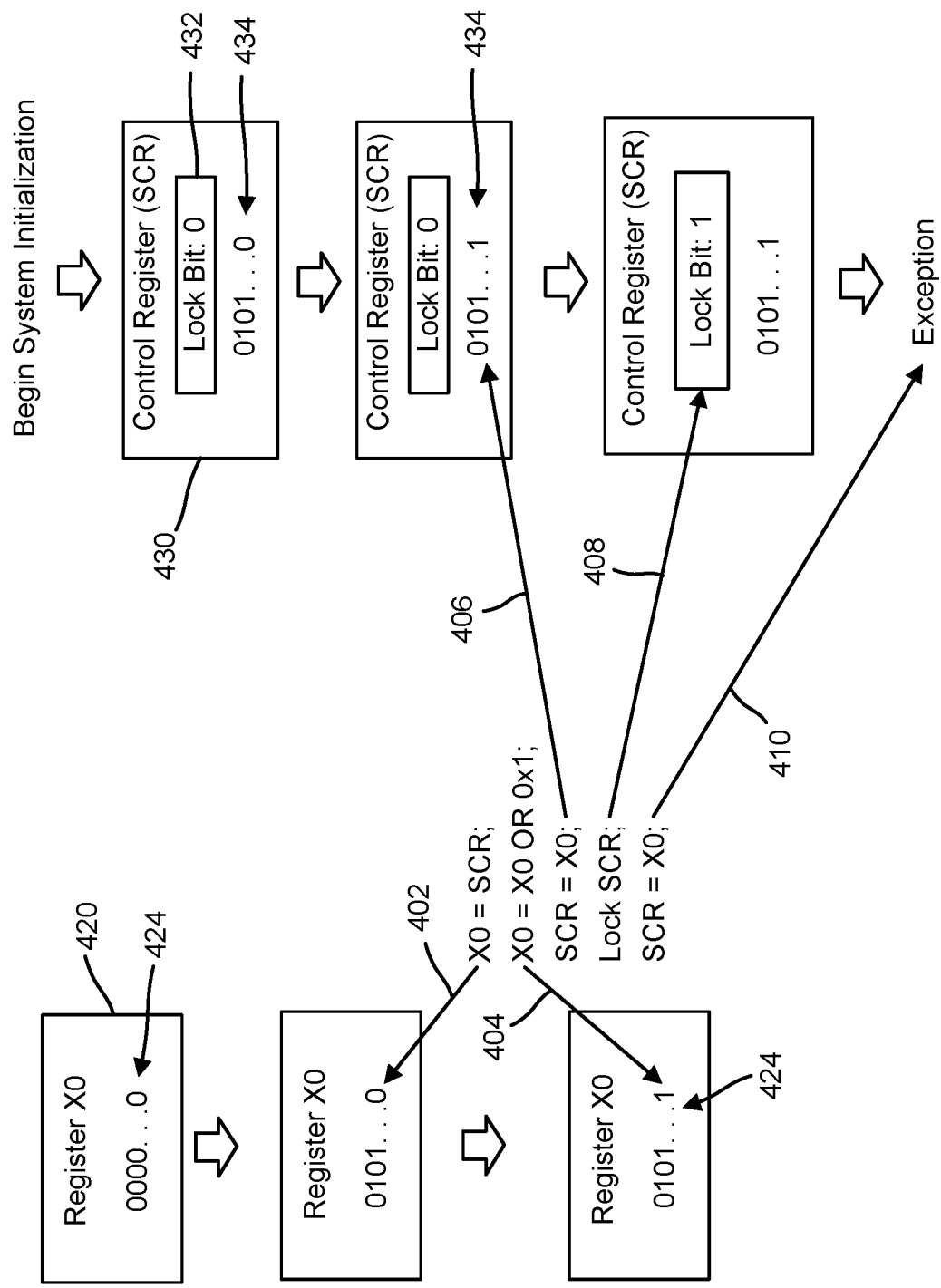
FIG. 4 illustrates an example of an instruction sequence including a write to a locked control register, according to certain aspects of the disclosure.

FIG. 4 illustrates an example of an instruction sequence including a write to a locked control register, according to certain aspects of the disclosure. The instructions are shown in pseudocode since the format of the instructions can vary across implementations and depending on instruction set architecture. The instruction sequence in FIG. 4 begins at 402 and can include instructions executed as part of a system initialization process. System initialization may involve executing a boot sequence, for example, through a boot loader program installed in firmware or on the memory 120. The boot sequence can be executed when the computer system is powered on or restarted (e.g., a hard reset or a reboot) and typically involves starting execution of one or more low-level applications such as the operating system 124 and/or the hypervisor 125. At least one of the applications that are started as a result of the boot sequence may be configured to place the computer system into a predetermined state (e.g., a target configuration) through writing configuration values into control registers.

FIG. 4 shows a control register 430 (named "SCR") set to an initial value 434 that is subsequently modified. FIG. 4 also shows a register 420 (named "X0") that is initialized to a value of zero. The register X0 may be a general-purpose register that is associated with the processor 110, the hardware device 130, or some other component in the computer system. Register X0 may be a physical or logical register used for temporary storage of data in connection with execution of instructions by the component that the register X0 is associated with. The value 424 may be initialized (set to zero in this example) by the same application that writes the value 434 into SCR. Alternatively, the register X0 may be configured (e.g., hard-wired) to set the value 424 to zero by default. At 402, an instruction sets the value 424 in register X0 to the value 434 stored in SCR. The instruction at 402 can be issued by the same application that set the initial value for SCR, e.g., the operating system 124 or the hypervisor 125. In some instances, the instruction at 402 may be issued by a different application.

At 404, the value 424 in X0 is updated to a value that is ultimately written to SCR in 406. In the example shown, the updated value is produced by performing a logical OR operation between the value 424 and 0x1. In this manner, the updated value corresponds to writing a 1 to the first bit of the value 424 while keeping the remaining bits unchanged.

At 406, the value in X0 is written to the control register SCR 430, thereby setting the contents of SCR to the value that was updated in 404.

At 408, a lock instruction is executed to set a lock bit 432 (e.g. to a value of 1) of the control register SCR 430 to indicate that SCR is now locked. The lock instruction can be issued by the same application that sets the value 434, e.g., the application that issued the instructions in 402, 404, and 406. In some instances, the lock instruction may be issued by another application that has authority to write to control register SCR. For example, referring back to FIG. 2, if the control register SCR is one of the control registers 212, only the hypervisor 125 or another application in privilege level 2 may be capable of locking SCR. However, in some implementations, a more privileged application may have authority to lock a control register associated with a lower privilege level. For example, both the operating system 124 and the hypervisor 125 may be capable of locking a control register 210. An application writing to a control register may therefore self-lock the control register, cause a peer application to lock the control register, or have the control register locked by a peer application acting on its own initiative. Accordingly, in some instances, the instructions at 402, 404, and 406 may be issued by the operating system 124, but the lock instruction at 408 may be issued by the hypervisor 125.

The lock instruction can be executed as part of completing the system initialization process. When multiple control registers are being written to, lock instructions can be executed in parallel or sequentially to lock each control register after the control register has been written. Once the control register SCR has been locked by setting the lock bit 432, the control register SCR may not be able to be unlocked until the computer system is re-initialized, e.g., after being reset. This implies that once the lock bit 432 has been set to lock SCR, the value of the lock bit 432 and the values of the storage bits controlled by the lock bit 432 (e.g., one or more configuration fields or the entirety of SCR) cannot be modified. Locking prevents the control register SCR from being further written to. However, one or more applications in the computer system may still have the authority to read from the control register SCR after it has been locked.

At 410, an instruction to set the value in control register SCR is received after SCR has been locked. The instruction at 410 may be received during runtime. For instance, the instruction at 410 may be generated by the operating system or hypervisor in response to a request from another application (e.g., user application 126) that does not have direct access to the control register SCR. Because SCR has already been locked at 410, the instruction triggers an exception that prevents the instruction at 410 from executing to completion. The exception may be triggered by a write-enable controller in the computer system, e.g., the write-enable controller 302 or 322, and may involve an interrupt that suspends or terminates any processes that are running on the computer system, e.g., processing threads executing on the processor 110.

In the example of FIG. 4, the instruction at 410 is identical to the instruction at 406 and tries to write the value from register X0 (the value 424) into the control register SCR. If the instruction at 410 were allowed to complete, the value 434 in SCR would not change because register X0 has not been modified since the control register SCR was last written. Nevertheless, the exception may be triggered in response to the instruction at 410 because the attempt to write to a locked control register may be considered a potential security risk. However, in some implementations, the computer system may not raise any exception in response to an attempted write that does not modify the contents of a locked control register. For example, the computer system may instead permit applications to continue running, possibly after presenting a warning to a user.

Figure 5:
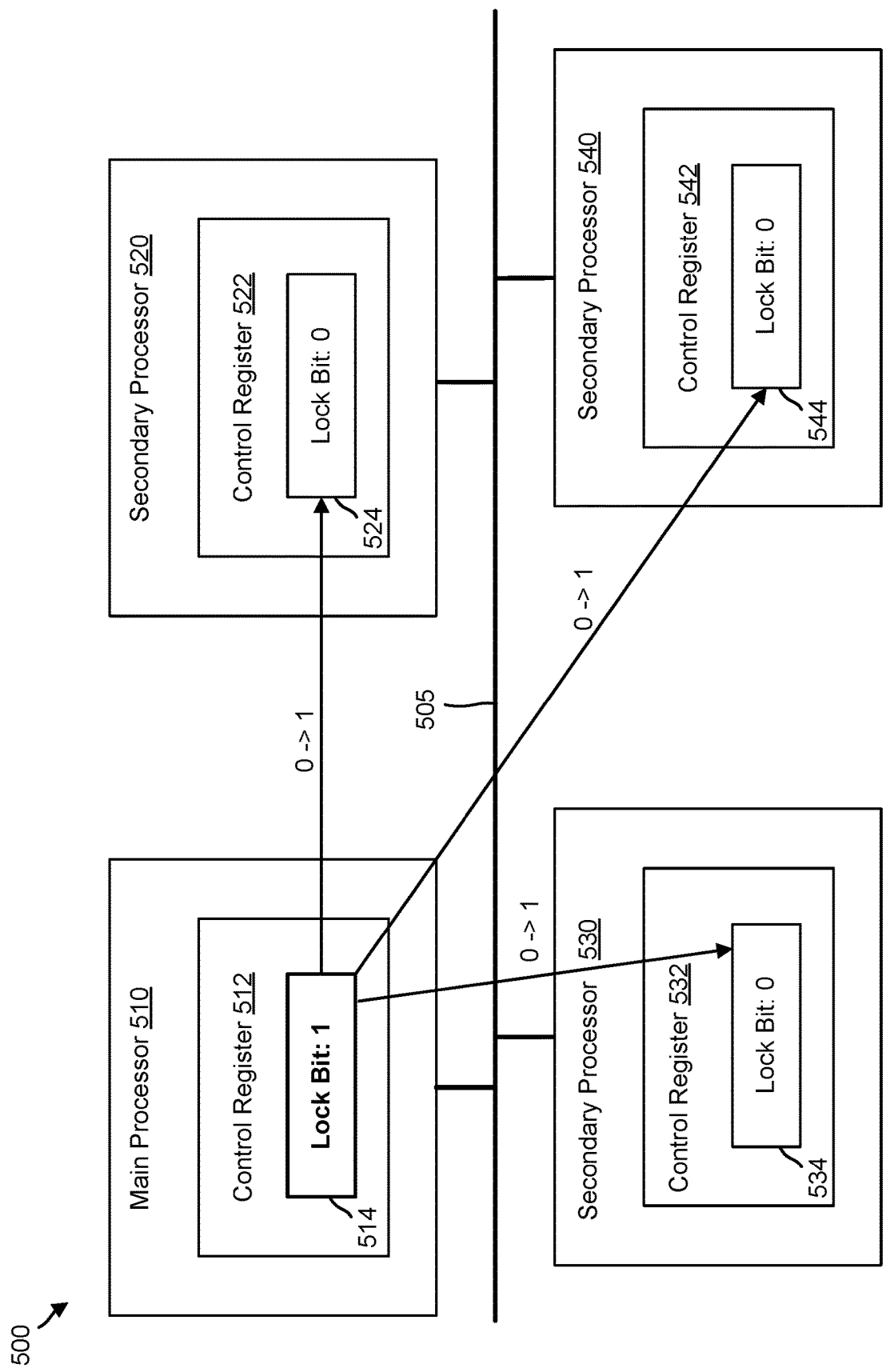
FIG. 5 illustrates an example of components in a computer system configured to lock a set of control registers concurrently, according to certain aspects of the disclosure.

FIG. 5 illustrates an example of components in a computer system 500 that is configured to lock a set of control registers concurrently, according to certain aspects of the disclosure. The computer system 500 may correspond to an implementation of the computer system 100 in FIG. 1 and includes a set of processors that are coupled to a communication channel 505 (e.g., one or more busses). The processors of the computer system 500 include a main processor 510 and secondary processors 520, 530, and 540. Each of the processors 510, 520, 530, and 540 is associated with a corresponding control register 512, 522, 532, and 542, respectively. In some implementations, the processors 510, 520, 530, and 540 may be separate devices configured to perform different types of processing tasks. For instance, the main processor 510 may be a CPU, the secondary processor 520 may be a graphics processing unit (GPU), the secondary processor 530 may be a field programmable gate array (FPGA), and the secondary processor 540 may be a neural network accelerator. Alternatively, the processors 510, 520, 530, and 540 may be configured to perform the same processing tasks and, as such, can be separate instances of the same processor or individual cores in a multi-core processor.

As shown in FIG. 1, locking the main processor 510 by setting a lock bit 514 in the control register 512 causes lock bits 524, 534, and 544 of the other control registers 522, 532, and 542 to also be set. The lock bit 514 may be set based on a software instruction such as the lock instruction at 406 of FIG. 4. In contrast, the setting of the lock bits 524, 534, and 544 can be performed through inter-processor communication, e.g., signals sent from the main processor 510 via the communication channel 505. Thus, the main processor 510 may be configured to cause the secondary processors to lock their respective control registers in response to the locking of the control register 512 in the main processor.

The locking behavior shown in FIG. 5 can be implemented as part of the design of computer system 500. For instance, one or more processors (e.g., main processor 510) may be preconfigured to initiate locking of control registers in other processors or other components of the computer system 500. The one or more processors that are preconfigured to initiate locking can be fixed in advance, e.g., by designating the main processor 510 as a master processor. In such instances, the secondary processors may be unable to initiate locking of the main processor. For example, setting the lock bit 524 in the control register 522 may have no effect on the lock status of the other control registers 512, 532, and 542. Alternatively, the processors 510, 520, 530, and 540 can be peer processors that are capable of initiating locking of control registers in peers based on locking of their own control register. Additionally, although FIG. 5 shows the locking of the control registers in the secondary processors as being performed in parallel, locking can also be performed sequentially. The processors 510, 520, 530, and 540 can be configured to lock their respective control registers in a certain order, e.g., in round-robin fashion beginning with the main processor 510 or whichever of the processors is the first to have its control register locked.

Figure 6:
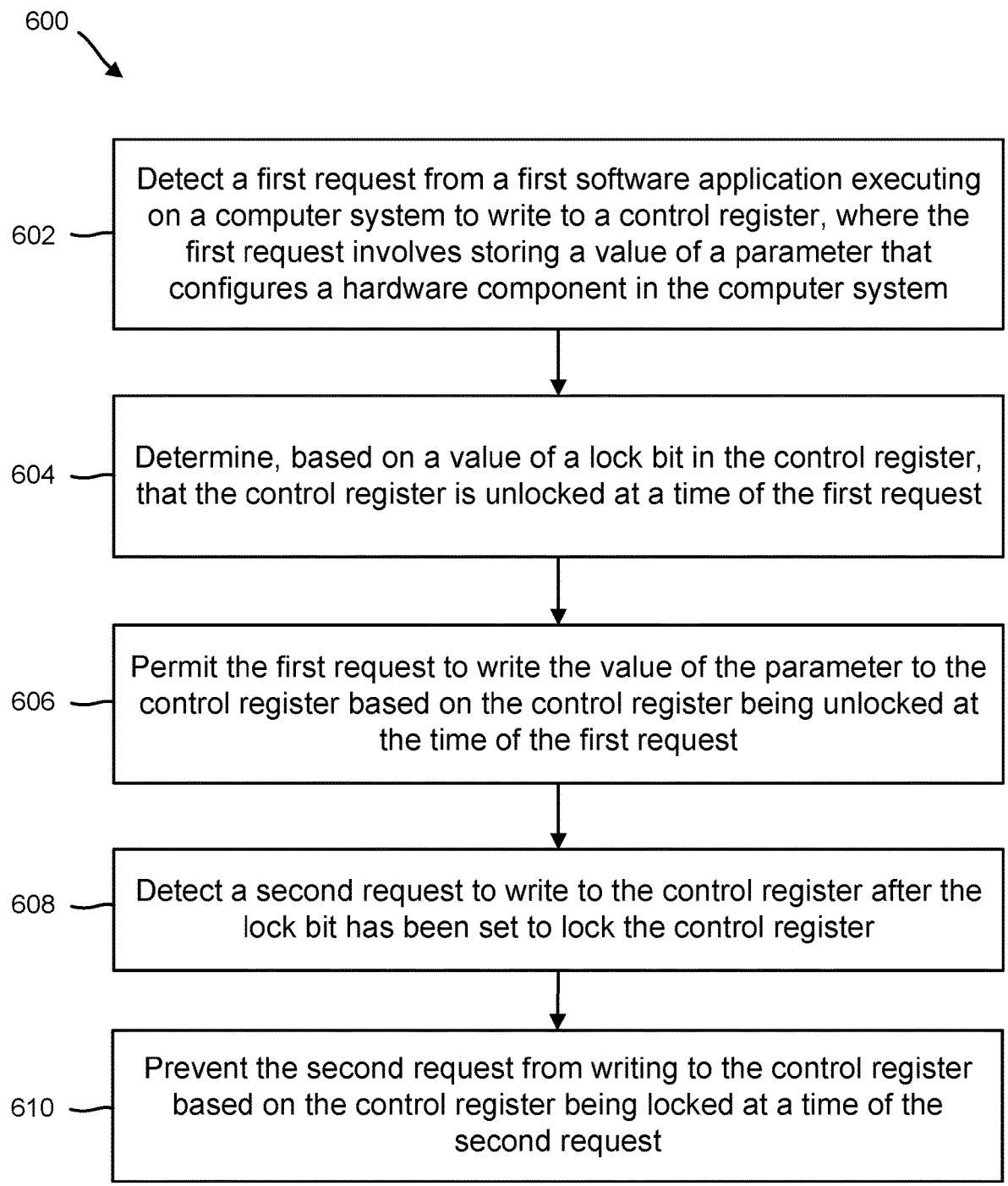
FIG. 6 is a flow diagram of an example method for controlling the configuration of a computer system, according to certain aspects of the disclosure.

FIG. 6 is a flow diagram of an example method 600 for controlling the configuration of a computer system, according to certain aspects of the disclosure. The method 600 can be performed by one or more processing units of a computer system that includes a lockable control register. The one or more processing units may implement a write-enable controller that determines whether to grant or deny permission to write to one or more control registers. In the examples of FIGS. 3A and 3B, the write-enable controller is associated with a single control register. However, in some implementations a write-enable controller may be shared by multiple control registers.

At block 602, a first request to write to a control register is detected. The first request is a request from a first software application (e.g., an operating system or hypervisor) executing on the computer system and involves storing a value of a parameter that configures a hardware component in the computer system. Depending on the value of the parameter, one or more features supported by the hardware component may be enabled, disabled, or otherwise configured. For example, if the hardware component is an MMU, the parameter may control whether the MMU is enabled or disabled, an amount of virtual memory to be allocated to a software application, or a size of a translation granule corresponding to the granularity of the mapping between an input (virtual) address and an output (physical) address. In some instances, the first request may be generated in connection with a system initialization process (e.g., during boot up) that places the computer system into an initial configuration state. The system initialization process may configure the computer system for runtime execution of one or more applications (e.g., user application 126) by loading preconfigured values into one or more control registers.

The first request in block 602 can be in the form of an instruction issued by the first software application. The write-enable controller may detect the first request as an instruction, e.g., a store instruction specifying the control register as a destination and further specifying the value to be written to the destination. In some implementations, the write-enable controller may detect the first request as one or more control signals that are derived from the instruction to write to the control register. For example, the instruction may be decoded by a processor (e.g., processor 110) that is responsible for generating input signals to the control register as part of executing the instruction, and the write-enable controller may be coupled to an input of the control register in order to receive an input signal generated by the processor.

At block 604, a determination is made, based on a value of a lock bit in the control register, that the control register is unlocked at a time of the first request. The determination in block 604 may involve reading the value of the lock bit and comparing the value to a value representing an unlocked state (e.g., 0) or a locked state (e.g., 1). In implementations where the control register includes multiple lock bits, the determination in block 604 may involve evaluating a combination of lock bit values, e.g., using a lookup table, to determine that the control register is unlocked. Further, in implementations where the lock bit is specific to a portion of the control register (e.g., a lock bit 340 in FIG. 3B) or specific to a subset of applications (e.g., a lock bit for a particular privilege level), the determination in block 604 may involve determining that the control register is unlocked with respect to the write that is the subject of the first request in block 604. For example, the write-enable controller may determine that the configuration field being written to is unlocked and/or that the first software application has sufficient authority (e.g., a requisite privilege level) to perform the write.

At block 606, the first request is permitted to write the value of the parameter to the control register, based on the determination in block 604 that the control register is unlocked at the time of the first request. The functionality in block 606 can be realized through hardware and/or software control. For instance, the write-enable controller may connect, using a switch, the control register to a signal line carrying the value of the parameter. As another example, the control register may include a clock input, and the write-enable controller may toggle a clock signal to trigger storage of the value.

At block 608, a second request to write to the control register is detected after the lock bit has been set to lock the control register. As described above, a control register can be locked by the same application that wrote to the control register earlier (e.g., the first software application in block 602) or by a different application (e.g., an application assigned to the same privilege level as the first software application). In some implementations, the lock bit is set immediately in response to a lock instruction. Alternatively, as discussed above, a control register can be locked after one or more conditions are satisfied. For example, the lock instruction may specify an amount of time that elapses relative to the last (most recent) write to the control register before the control register becomes locked. As another example, the lock instruction may specify a threshold number of times the control register can be written to before becoming locked. Thus, there may be a delay between when a lock instruction is issued and the time at which the lock bit is set to lock the control register.

In some implementations, a control register that has been locked cannot be unlocked until the computer system is reset, even by an application that otherwise has authority to write to the control register. Thus, a locked control register may be locked for all applications in the computer system. Alternatively, as discussed above, locking can be implemented using lock bits that are specific to a particular privilege level or security domain. Accordingly, a control register that is locked for writing by applications in a first privilege level (e.g., through setting of a lock bit by an application in the first privilege level) can still be written to by an application in a second privilege level that is more privileged. The inability to unlock a control register can be enforced in various ways, such as by including a lock instruction in a supported instruction set without also including an unlock instruction, hardwiring the control register to maintain the value of a lock bit once the lock bit has been set, or providing a write-enable controller with logic to prevent a lock bit from being reset (e.g., back to 0).

Subsequent requests to write to the control register can also come from the same or a different application. In some instances, the second request in block 608 corresponds to an instruction from the first software application. For instance, the second request may be generated by the first software application on behalf of a second software application that has no direct access to the control register, e.g., in response to an application programming interface (API) call from the user application 126 at runtime. In other instances, the second request corresponds to an instruction from another software application that would have been able to write to the control register had the control register not been locked.

At block 610, the second request is prevented from writing to the control register, based on the control register being locked at a time of the second request. For example, the write-enable controller may perform operations similar to those described in connection with block 604, using an updated value of the lock bit, to determine that the control register is locked for all writes or locked for purposes of the write that is the subject of the second request. In response to this determination, the write-enable controller may disable the control register, terminate execution of the write being requested, or perform other steps that prevent the value currently stored in the control register from being updated.

Additionally, as discussed above, the write-enable controller may cause an interrupt to be generated in order to trigger an exception that will be handled using an appropriate exception handling routine. Depending on how the exception handling routine is implemented, the computer system may permit the application that generated the second request to continue running or take some other action such as suspending/terminating the application or terminating processing for all applications until the computer system has been reset into an initial configuration state. Further, in some implementations, the computer system may be configured to treat an attempt to unlock a locked control register in a similar manner to an attempt to write to a locked control register. For example, a write-enable controller may cause an interrupt to be generated in response to detecting a request to unlock a control register, and the resulting exception may be handled using the same or a different exception handling routine.

Figure 7:
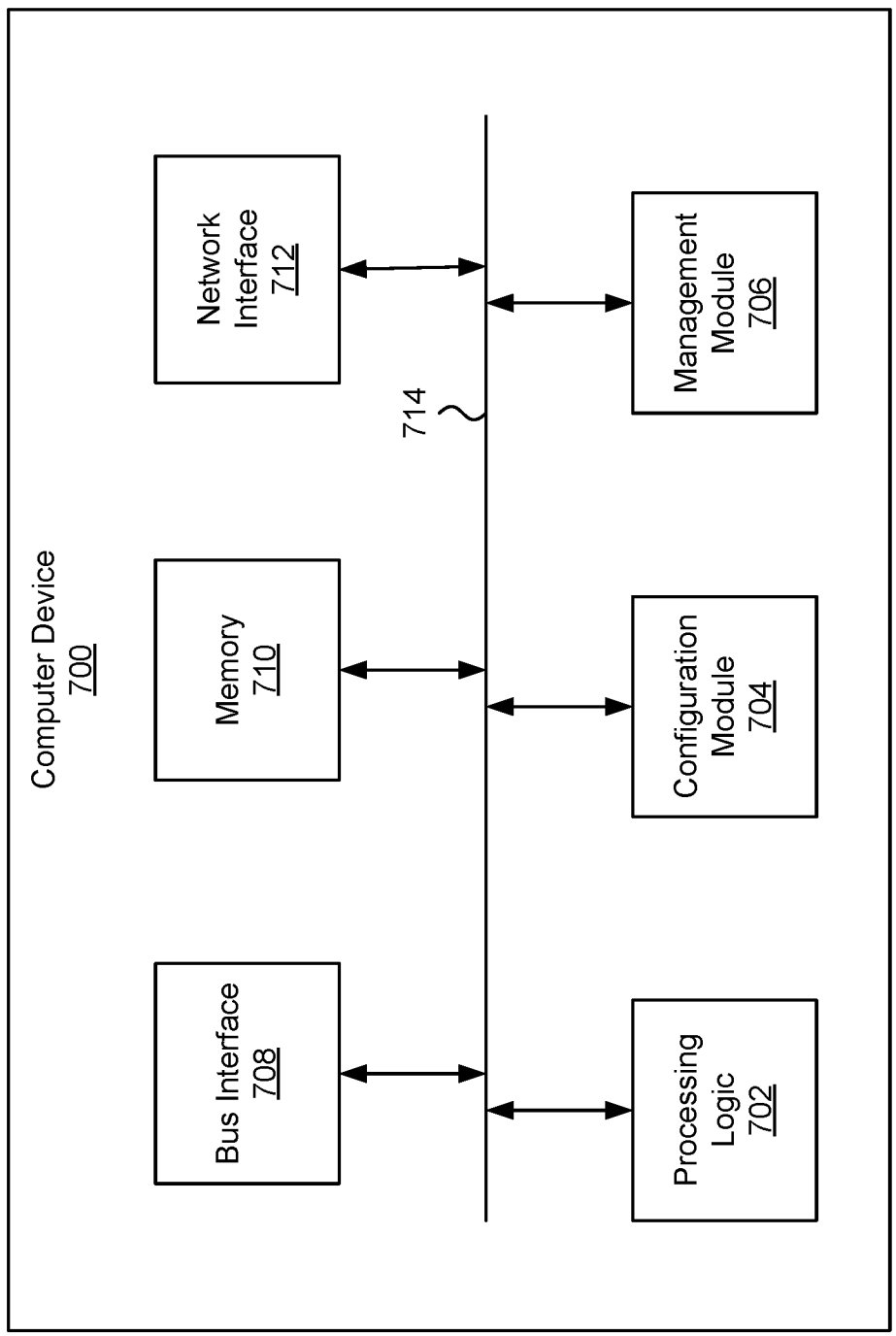
FIG. 7 illustrates an example of a computer device, according to certain aspects of the disclosure.

FIG. 7 illustrates an example of a computer device 700. Functionality and/or several components of the computer device 700 may be used without limitation with other embodiments disclosed elsewhere in this disclosure, without limitations. For example, computer device 700 may be a server in the computer system 100 of FIG. 1 and, as such, may include components that are configured using a lockable control register. As another example, in some implementations the computer device 700 may operate as a write-enable controller that prevents writing to one or more locked control registers. Additionally, in some implementations the computer system 100 may include a network of computer devices 700, such as the network 800 in FIG. 8.

The computer device 700 may facilitate processing of packets and/or forwarding of packets from the computer device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computer device 700 may be the recipient and/or generator of packets. In some implementations, the computer device 700 may modify the contents of the packet before forwarding the packet to another device. The computer device 700 may be a peripheral device coupled to another computer device, a switch, a router or any other suitable device enabled for receiving and forwarding packets.

In one example, the computer device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The computer device 700 may include additional modules, not illustrated here, such as components discussed with respect to the nodes disclosed in FIG. 8. In some implementations, the computer device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical, arithmetic, and floating point operations. Examples of processors that may be included in the processing logic 702 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computer device 700, while in other cases some or all of the memory may be external to the computer device 700. The memory 710 may store an operating system comprising executable instructions that, when executed by the processing logic 702, provides the execution environment for executing instructions providing networking functionality for the computer device 700. The memory may also store and maintain several data structures and routing tables for facilitating the functionality of the computer device 700.

In some implementations, the configuration module 704 may include one or more configuration registers. Configuration registers may control the operations of the computer device 700. In some implementations, one or more bits in the configuration register can represent certain capabilities of the computer device 700. Configuration registers may be programmed by instructions executing in the processing logic 702, and/or by an external entity, such as a host device, an operating system executing on a host device, and/or a remote device. The configuration module 704 may further include hardware and/or software that control the operations of the computer device 700.

In some implementations, the management module 706 may be configured to manage different components of the computer device 700. In some cases, the management module 706 may configure one or more bits in one or more configuration registers at power up, to enable or disable certain capabilities of the computer device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computer device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer device 700 may include multiple network interface modules, each configured to communicate with a different network. For example, in these implementations, the computer device 700 may include a network interface module for communicating with a wired Ethernet network, a wireless 802.11 network, a cellular network, an Infiniband network, etc.

The various components and modules of the computer device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
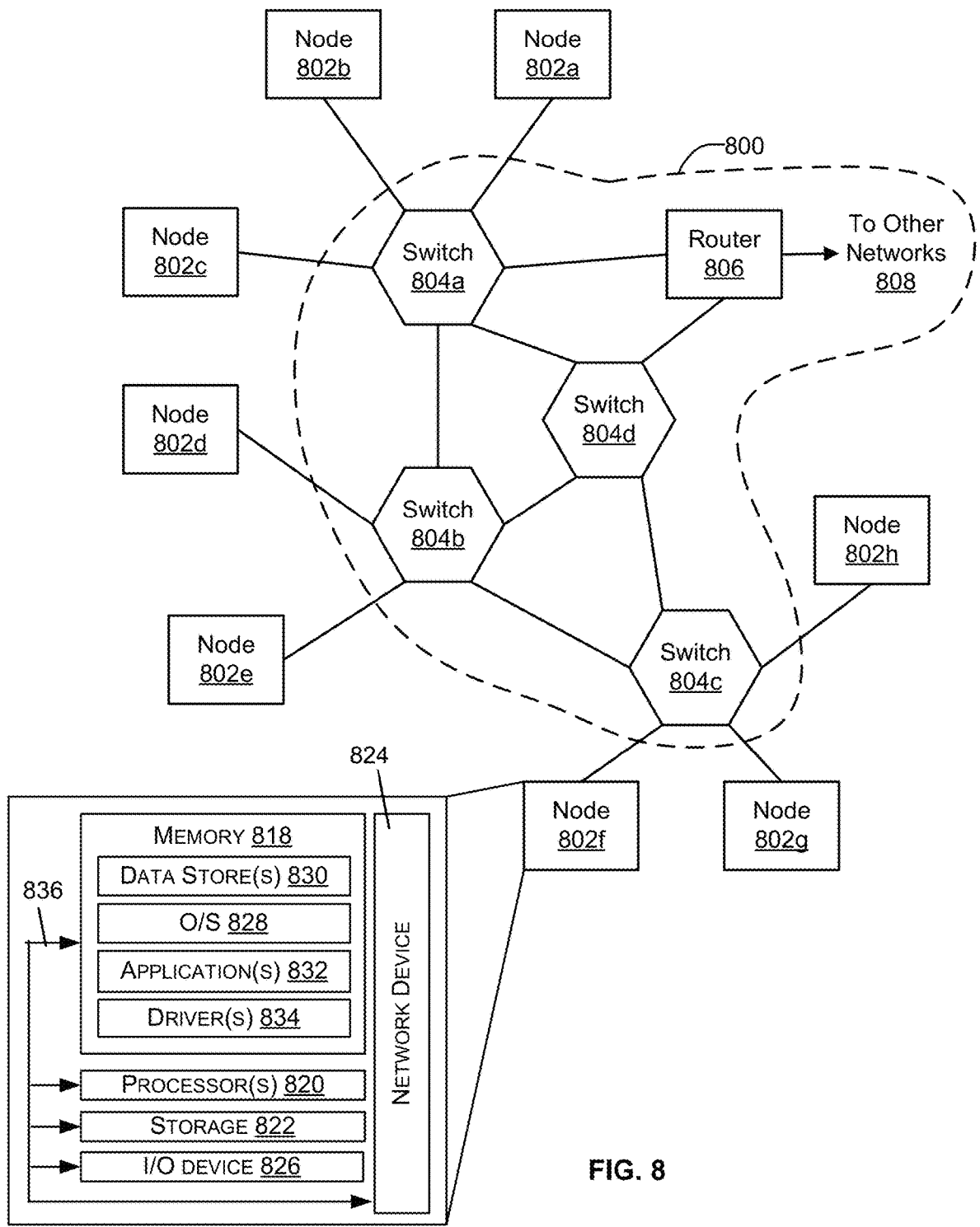
FIG. 8 illustrates an example architecture for features and systems described herein that includes one or more service provider computers and/or a user device connected via one or more networks, according to certain aspects of the disclosure.

FIG. 8 illustrates a network 800 with nodes corresponding to various types of computer devices, e.g., different implementations of computer device 700 in FIG. 7, such as nodes comprising the computer device, switches, and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A computer device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more computer devices (e.g., routers 806) for connection with other networks 808, such as other subnets, LANs, wide area networks (WANs), or the Internet. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the computer device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer system, comprising:
a memory storing a plurality of software applications, the plurality of software applications including a first software application and a second software application;
a processor configured to execute the plurality of software applications;
a control register associated with the processor, wherein the control register comprises a lock bit and one or more additional bits, the one or more additional bits representing a configuration parameter that enables or disables functionality provided by the processor or another hardware component of the computer system; and
a write-enable controller implemented using one or more processing units, wherein:
the first software application is configured to update a value of the configuration parameter by writing the one or more additional bits;
the second software application is configured to indirectly access the control register through making a request to the first software application or another software application with permission to access the control register;
the first software application is assigned to a privilege level that permits writing to the control register, including setting a value of the lock bit; and
the write-enable controller is configured to prevent any software application, irrespective of privilege level, from writing to the control register after the control register has been locked, wherein to prevent writing to the control register, the write-enable controller evaluates the lock bit in response to a request from one of the plurality of software applications to further update the value of the configuration parameter.

2. The computer system of claim 1, wherein:
the first software application is assigned to a first privilege level that provides write access to the control register;
the plurality of software applications includes a third application assigned to a second privilege level that is more privileged than the first privilege level; and
the write-enable controller is configured to prevent the third application from writing to the control register after the control register has been locked.

3. The computer system of claim 1, wherein:
the first software application is assigned to a first privilege level that provides write access to the control register;
the plurality of software applications includes a third application assigned to the first privilege level or a second privilege level that is more privileged than the first privilege level; and
the third application is configured to set the lock bit independently of the first software application.

4. The computer system of claim 1, wherein once locked, the control register cannot be unlocked until the computer system is reset.

5. An apparatus, comprising:
a write-enable controller implemented using one or more processing units, wherein the write-enable controller is communicatively coupled to a control register in a computer system, the control register comprising a lock bit and one or more additional bits, the one or more additional bits representing a configuration parameter that configures a hardware component of the computer system, and wherein the write-enable controller is configured to:
- detect a first request to write to the control register, wherein the first request is from a first software application executing on the computer system and comprises an updated value for the configuration parameter;
- determine, based on a value of the lock bit in the control register, that the control register is unlocked at a time of the first request;
- permit the first request to write the updated value to the one or more additional bits of the control register based on the control register being unlocked at the time of the first request;
- detect a second request to write to the control register, wherein the second request is generated by the first software application after the lock bit has been set to lock the control register; and
- prevent the second request from writing to the control register based on the control register being locked at a time of the second request.

6. The apparatus of claim 5, wherein the lock bit is set by the first software application to lock the control register after the updated value has been written to the one or more additional bits of the control register.

7. The apparatus of claim 5, wherein:
the first software application is assigned to a first privilege level that provides write access to the control register; and
the write-enable controller is configured to prevent a second software application assigned to a second privilege level from writing to the control register after the control register has been locked, the second privilege level being more privileged than the first privilege level.

8. The apparatus of claim 5, wherein:
the first software application is assigned to a first privilege level that provides write access to the control register; and
the control register is locked by a second software application assigned to the first privilege level or a second privilege level that is more privileged than the first privilege level.

9. The apparatus of claim 5, wherein the second request is generated by the first software application on behalf of a second software application executing on the computer system, and wherein the second software application has no direct access to the control register.

10. The apparatus of claim 9, wherein the first software application is an operating system or hypervisor, and wherein the second software application is a user application.

11. The apparatus of claim 5, wherein the write-enable controller is further configured to cause an interrupt to be generated in response to the write-enable controller determining that the control register is locked at the time of the second request.

12. The apparatus of claim 11, wherein the interrupt prevents further processing by the computer system until the computer system is reset.

13. The apparatus of claim 11, wherein the write-enable controller is configured to cause the interrupt to be generated irrespective of whether the second request would change any of the bits in the control register.

14. The apparatus of claim 5, wherein:
the control register includes a first field and a second field;
the lock bit is associated with the first field; and
the write-enable controller is configured to prevent writing to the first field but not the second field when the lock bit has been set.

15. The apparatus of claim 5, wherein:
the lock bit is set after the updated value has been written to the one or more additional bits of the control register, during an initialization process in which the computer system is configured for runtime execution of a second software application; and
the second request is generated during the runtime execution of the second software application.

16. The apparatus of claim 15, wherein the configuration parameter configures a memory management unit (MMU) in the computer system, the MMU being operable to translate a virtual address to a physical address within a range of physical addresses allocated to the second software application.

17. The apparatus of claim 5, wherein the control register is configured to set the lock bit in response to one of the following events:
an amount of time elapsing since the control register was last written to, the amount of time being specified by the first software application; or
a threshold number of writes to the control register being reached, the threshold number of writes being specified by the first software application.

18. A computer-implemented method, comprising:
- detecting, by a write-enable controller, a first request to write to a control register in a computer system, the control register comprising a lock bit and one or more additional bits, the one or more additional bits representing a configuration parameter that configures a hardware component of the computer system, wherein the first request is from a first software application executing on the computer system and comprises an updated value for the configuration parameter;
- determining, by the write-enable controller and based on a value of the lock bit in the control register at a time of the first request, that the control register is unlocked;
- permitting, by the write-enable controller, the first request to write the updated value to the one or more additional bits of the control register based on the control register being unlocked at the time of the first request;
- detecting, by the write-enable controller, a second request to write to the control register, wherein the second request is generated by the first software application after the lock bit has been set to lock the control register; and
- preventing, by the write-enable controller, the second request from writing to the control register based on the control register being locked at a time of the second request.

19. The computer-implemented method of claim 18, further comprising:
causing, by the write-enable controller, an interrupt to be generated in response to the write-enable controller determining that the control register is locked at the time of the second request, wherein the interrupt prevents further processing by the computer system until the computer system is reset.

20. The computer-implemented method of claim 18, wherein the lock bit is set by the first software application to lock the control register after the updated value has been written to the one or more additional bits of the control register.

* * * * *